(12) United States Patent
Chuo et al.

(10) Patent No.: US 11,919,284 B2
(45) Date of Patent: Mar. 5, 2024

(54) ROTARY SEAT AND ROTARY TABLE (71) Applicant: HIWIN TECHNOLOGIES CORP., Taichung (TW)

(72) Inventors: Yung-Tsai Chuo, Taichung (TW); Yaw-Zen Chang, Taichung (TW); Jui-Che Lin, Taichung (TW); Yu-Hsien Ho, Taichung (TW); Yu Liu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 404 days.

(21) Appl. No.: 17/304,005

(22) Filed: Jun. 11, 2021

(65) Prior Publication Data
US 2022/0176674 A1 Jun. 9, 2022

(30) Foreign Application Priority Data

Dec. 7, 2020 (TW) .................................. 109142988

(51) Int. Cl.
F16M 11/00 (2006.01)
B32B 5/10 (2006.01)
B32B 5/12 (2006.01)
B65G 29/00 (2006.01)

(52) U.S. Cl.
CPC .................. *B32B 5/12* (2013.01); *B32B 5/10* (2013.01); *B65G 29/00* (2013.01)

(58) Field of Classification Search
CPC .... B32B 5/12; B32B 5/10; B32B 5/26; B65G 29/00; B23Q 1/015; B23Q 1/52; B23Q 1/5437; A47C 3/18; A47C 5/00; B60Y 2304/03
See application file for complete search history.

(56) References Cited

U.S. PATENT DOCUMENTS

| 6,817,300 | B2 * | 11/2004 | Schwenker | ............. | B60S 13/02 |
| | | | | | 104/44 |
| 10,092,112 | B1 | 10/2018 | Waszak | | |
| 10,486,558 | B1 * | 11/2019 | Baccouche | ............ | B60N 2/146 |
| 10,820,866 | B2 * | 11/2020 | Campagna | ......... | A61G 13/0036 |
| 11,691,857 | B2 * | 7/2023 | Peacemaker | .............. | B60S 9/08 |
| | | | | | 254/424 |
| 2016/0356334 | A1 * | 12/2016 | Onoue | .................... | B60R 19/03 |

FOREIGN PATENT DOCUMENTS

JP 2005-69871 A 3/2005
JP 2013-082303 A 5/2013

* cited by examiner

*Primary Examiner* — Amy J. Sterling
(74) *Attorney, Agent, or Firm* — Wang Law Firm, Inc.

(57) ABSTRACT

A rotary seat including a base includes an outer surface, and a composite material layer attached to at least a part of the outer surface. The base also includes a recess for accommodating a turntable and including a first opening on the outer surface. The material of the composite material layer includes fibers and a resin. Therefore, the rotary seat may be more lightweight. A rotary table is also provided and includes the rotary seat, a driving device which drives the rotary seat to rotate, and a turntable which is rotatably disposed in the recess of the base.

10 Claims, 13 Drawing Sheets

ROTARY SEAT AND ROTARY TABLE

BACKGROUND

Field of the Invention

The present invention relates to a rotary table, and more particularly to a lightweight rotary seat with fiber material, and a rotary table using the same.

Description of Related Art

Most of the existing rotary tables use metal (for example, cast iron, cast aluminum) rotary seats (or saddles) to support the turntable. Due to the heavy weight of the metal rotary seat, the center-gravity distance between the center of gravity of the rotary seat and the rotation axis of the driving device of the rotary table is also larger, so that the driving device is required to provide a large driving force to rotate the rotary seat relative to the driving device.

Therefore, how to simultaneously reduce the demand for the driving force of the driving device and make the rotation of the rotary seat meet the needs of the application is a problem to be overcome at present.

SUMMARY

One objective of the present invention is to provide a lightweight rotary seat with fiber material, and a rotary table using the same.

A rotary seat provided in accordance with an embodiment of the invention comprises: a base, including a recess and an outer surface, wherein the recess includes a first opening on the outer surface and is used for accommodating a turntable, and the base is made of metal; and a composite material layer used for attaching to at least a part of the outer surface of the base, wherein the composite material layer includes fiber and resin.

A rotary table provided in accordance with an embodiment of the invention comprises: the rotary seat as described above; a driving device rotatably connected to the rotary seat and used for driving the rotary seat to rotate; and a turntable rotatably arranged in the recess of the rotary seat.

In this way, the rotary seat provided by the present invention can achieve the purpose of lightweight.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

After studying the detailed description in conjunction with the following drawings, other aspects and advantages of the present invention will be discovered.

DETAILED DESCRIPTION

In the following detailed description, many specific details are explained in order to provide a thorough understanding of the present invention. However, those of ordinary skill in the art will understand that the present invention can be practiced without these specific details. In other cases, well-known methods, procedures and/or elements have not been described in detail so as not to obscure the present invention.

Please refer to FIGS. 1-3 and FIG. 11, illustrating a rotary table 10 according to an embodiment of the present invention that includes a driving device 11, a rotary seat 12 and a turntable 13. The driving device 11 is installed on a ground or an external machine platform. The driving device 11 includes a housing 111 and a first torque motor (i.e., the first driver) arranged in the housing 111. An output shaft 112 of the first torque motor extends out of the housing 111 and is connected to the rotary seat 12 to drive the rotary seat 12 to rotate. The turntable 13 is rotatably assembled to the rotary seat 12. A rotation axis C1 of the rotary seat 12 and a rotation axis C2 of the turntable 13 are not parallel to each other; and for example, the rotation axis C1 and the rotation axis C2 are substantially perpendicular to each other.

Figure 1:
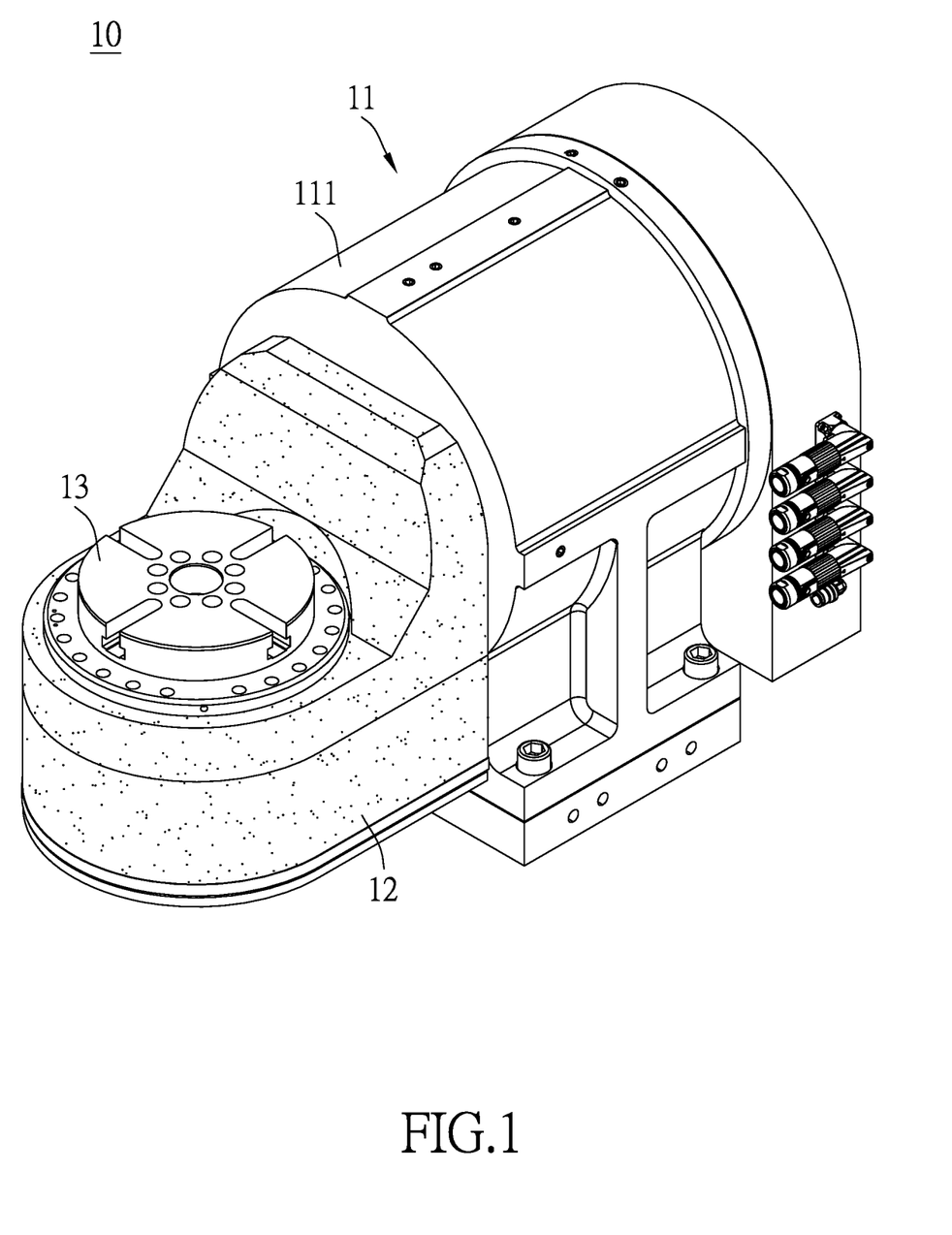
FIG. 1 is a perspective view of a rotary table according to an embodiment of the present invention.
Figure 2:
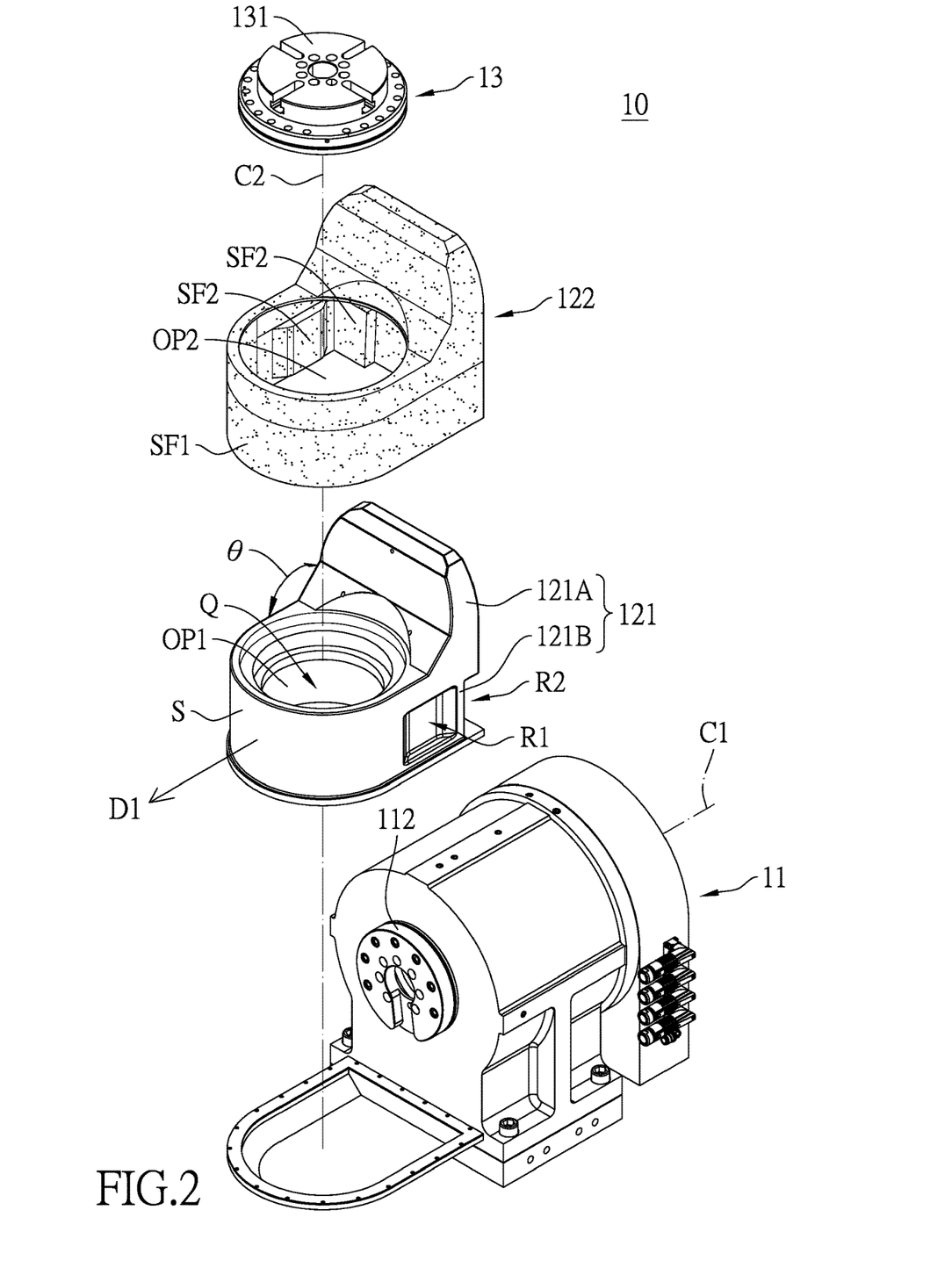
FIG. 2 is an exploded view of the rotary table of FIG. 1.
Figure 3:
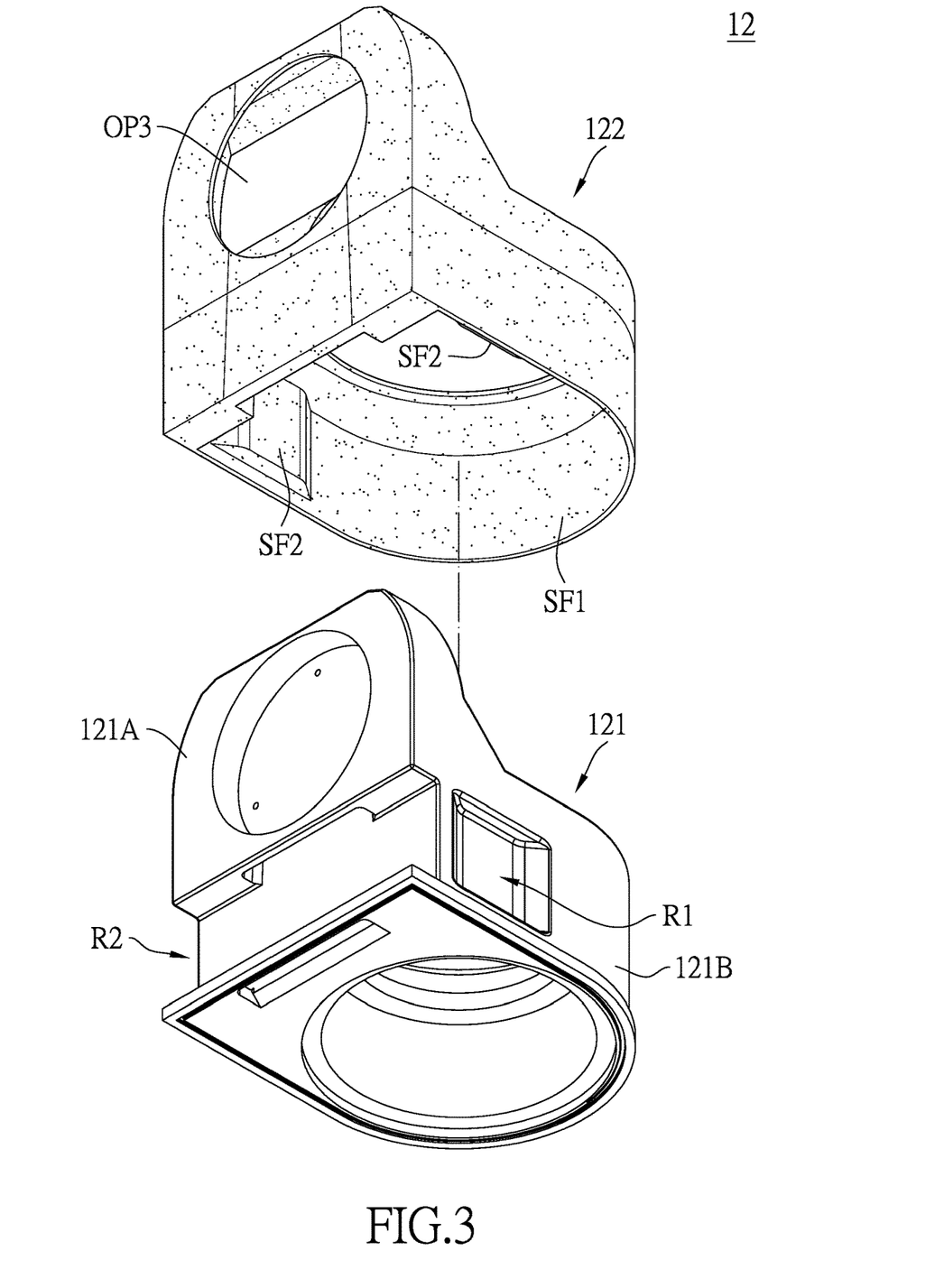
FIG. 3 is an exploded view of the rotary seat of FIG. 1.

The rotary seat 12 includes a base 121 and a composite material layer 122. The material of the base 121 is metal. The material of the composite material layer 122 includes fiber and resin. The fiber can be, for example, carbon fiber, fiberglass, boron fiber, graphite fiber, silicon carbide fiber, basalt fiber, Kevlar fiber or any combination thereof. The resin can be, for example, epoxy, thermoset, thermoplastic, cyanate ester, polyester, aramid, chlorofluorocarbon or any combination thereof. The base 121 includes at least one connecting portion 121A and a carrying portion 121B. The carrying portion 121B is detachably connected or integrally formed to the connecting portion 121A. An angle θ between the carrying portion 121B and the connecting portion 121A is greater than 0 degrees. The connecting portion 121A is connected to the output shaft 112 of the first torque motor and is driven by the output shaft 112 to rotate. The carrying portion 121B of the base 121 includes a recess Q. The recess Q includes a first opening OP1 on an outer surface S of the base 121. Therefore, the turntable 13 can be inserted into the recess Q from the first opening OP1. In this embodiment, the turntable 13 includes a disk body 131 and a second torque motor (i.e., the second driver) that drives the disk body 131 to rotate. The second torque motor is disposed in the recess Q, and the disk body 131 is located at the position of the first opening OP1 and protrudes from the first opening OP1.

The composite material layer 122 is configured to be attached to at least a part of the outer surface S of the base 121. The composite material layer 122 includes a second opening OP2. The second opening OP2 overlaps the first opening OP1, so the second opening OP2 can expose the inside of the base 121 under the composite material layer 122. The composite material layer 122 also includes a third opening OP3. The third opening OP3 exposes the junction between the connecting portion 121A and the output shaft 112 of the first torque motor of the driving device 11. The volume of the composite material layer 122 may account for 20% to 50% of the sum of the volume of the base 121 and the volume of the composite material layer 122.

Figure 11:
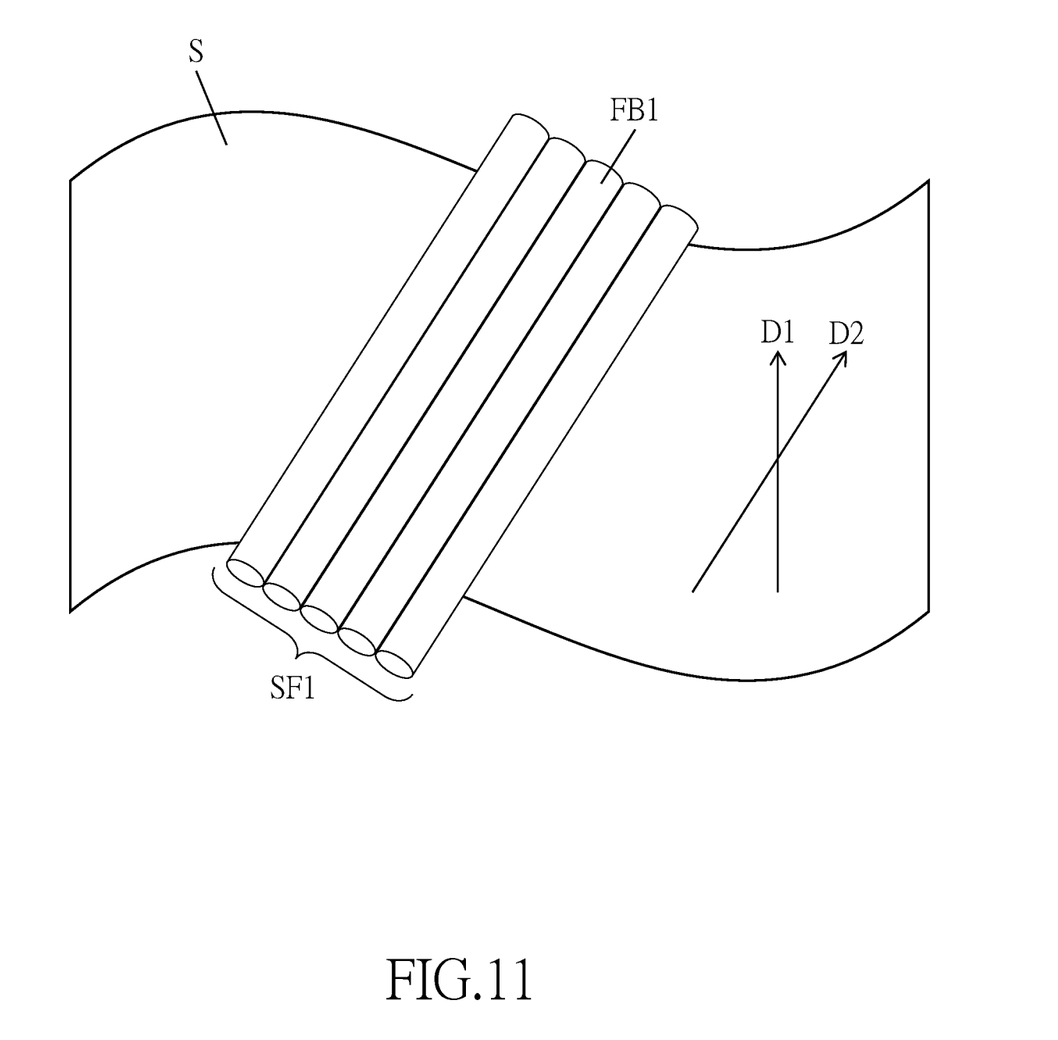
FIG. 11 is a schematic diagram of a stacked layer according to an embodiment of the present invention to show the orientation of its fibers.
Figure 12:
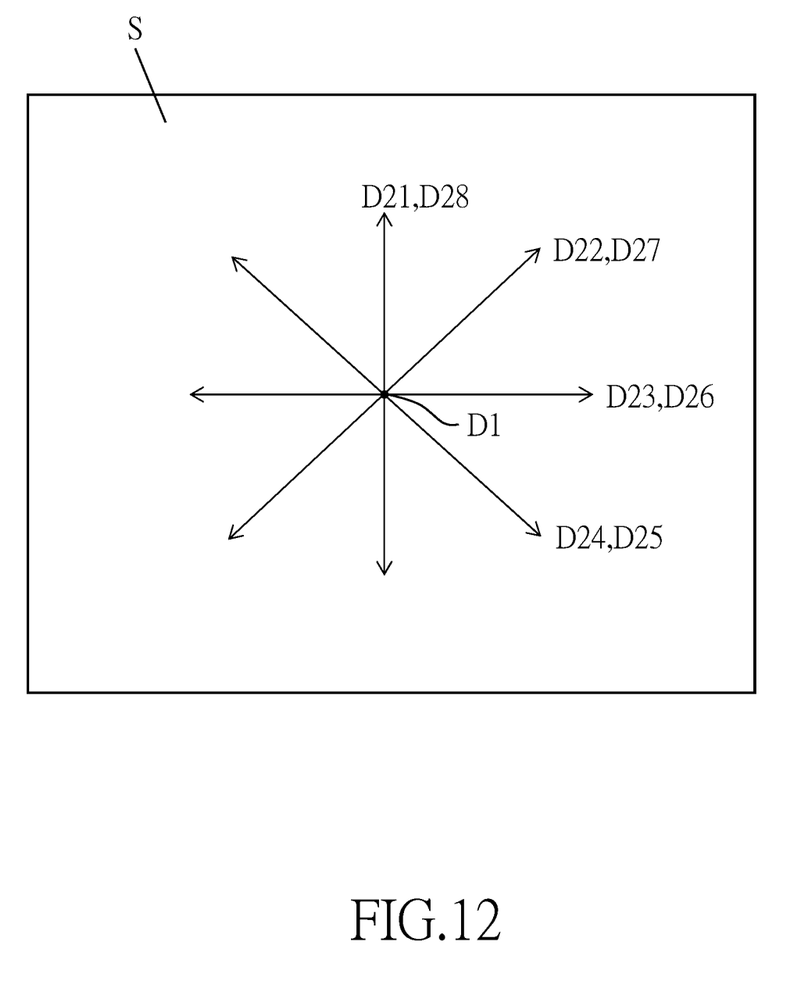
FIG. 12 is a schematic diagram of the axial directions of the fibers of stacked layers according to an embodiment of the present invention, to show that the axial directions are symmetrically arranged.

The composite material layer 122 includes a plurality of stacked layers SF1, for example, 8 stacked layers SF1. The composite material layer 122 is a stacked structure formed by stacking these stacked layers SF1 upward along an axial direction D1 (referred to as first axial direction), as shown in FIGS. 2 and 11. The fibers FB1 of a respective stacked layer SF1 are arranged in parallel to an axial direction D2 (referred to as second axial direction). The axial direction D1 is perpendicular to the outer surface S (that is a flat surface or a curved surface) of the base 121, and the axial direction D1 is perpendicular to the axial direction D2. In addition, the axial directions D2 for at least two of the stacked layers SF1 are not parallel, so that the structure of the composite material layer 122 can be strengthened. In this embodiment, the axial directions D2 of the fibers FB1 of the stacked layers SF1 are, for example, symmetrically arranged in the axial direction D1. In a case of the composite material layer 122 having 8 stacked layers SF1 stacked along the axial direction D1, as shown in FIGS. 11 and 12, the axial direction of the fibers FB1 of the stacked layer SF1 serving as the first layer is D21, the axial direction of the fibers FB1 of the stacked layer SF1 serving as the second layer is D22, the axial direction of the fibers FB1 of the stacked layer SF1 serving as the third layer is D23, the axial direction of the fibers FB1 of the stacked layer SF1 serving as the fourth layer is D24, the axial direction of the fibers FB1 of the stacked layer SF1 serving as the fifth layer is D25, the axial direction of the fibers FB1 of the stacked layer SF1 serving as the sixth layer is D26, the axial direction of the fibers FB1 of the stacked layer SF1 serving as the seventh layer is D27, the axial direction of the fibers FB1 of the stacked layer SF1 serving as the eighth layer is D28; and the axial directions D21 and D28 of the fibers FB1 of the stacked layers SF1 serving as the first and eighth layers are the same, the axial directions D22 and D27 of the fibers FB1 of the stacked layers SF1 serving as the second and seventh layers are the same, the axial directions D23 and D26 of the fibers FB1 of the stacked layers SF1 serving as the third and sixth layers are the same, and the axial directions D24 and D25 of the fibers FB1 of the stacked layers SF1 serving as the fourth and fifth layers are the same.

Figure 13:
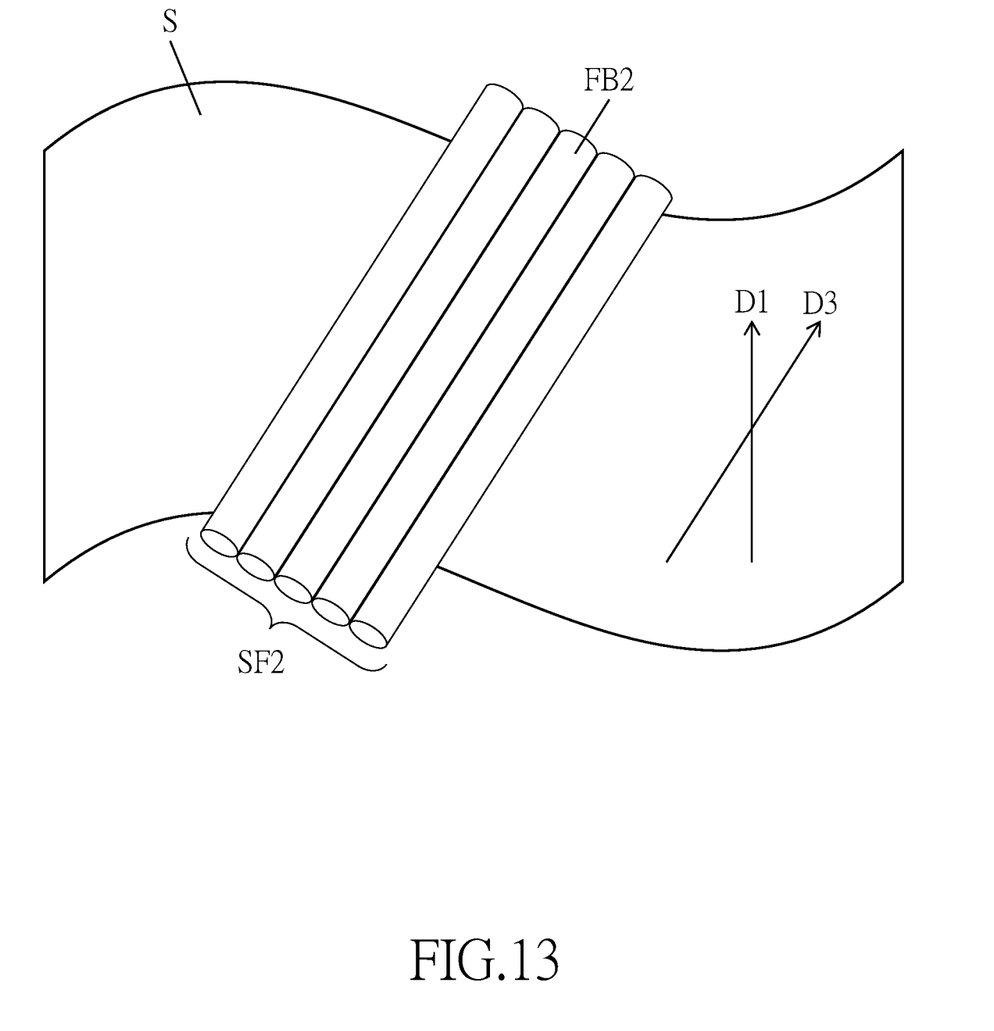
FIG. 13 is a schematic diagram of a reinforcing layer according to an embodiment of the present invention to show the orientation of its fibers.

In this embodiment or other embodiments, the composite material layer 122 as a stacked structure may further include at least one reinforcing layer SF2, and the material of the reinforcing layer SF2 is the same as that of the stacked layer SF1. The fibers FB2 of the reinforcing layer SF2 are arranged in parallel to an axial direction D3 (referred to as third axial direction), as shown in FIGS. 2, 3 and 13, and the axial direction D3 of the fibers FB2 of the reinforcing layer SF2 is the same as the axial direction D2 of the fibers FB1 of one of the stacked layers SF1. Therefore, the reinforcing layer SF2 can provide reinforcement in the axial direction D3. The reinforcing layer SF2 and the foregoing stacked layers SF1 are stacked upward along the axial direction D1, and the reinforcing layer SF2 can be sandwiched in between adjacent two of the stacked layers SF1 or arranged on the outermost or innermost side of the stacked layers SF1. The total area, occupied by all the reinforcing layers SF2, on the outer surface S is smaller than the total area, occupied by all the stacked layers SF1, on the outer surface S. The outer surface S of the base 121 is recessed in the position where the reinforcing layer SF2 is disposed, as compared to the outer surface S of the base in the position where only the stacked layers SF1 are disposed. The location of the reinforcing layer SF2 can be a stress-concentrated region on the rotary seat 12 to prevent the composite material layer 122 from bending and warping. For example, as shown in FIG. 3, the opposite side surfaces of the carrying portion 121B are respectively provided with a recessed region R1 at the connection with the connecting portion 121A, and/or the back surface of the connecting portion 121A (the region connected to the first torque motor) is provided with a recessed region R2 in a position where the second torque motor is connected and that is on a side close to the carrying portion 121B; during the process of forming the composite material layer 122, in the region, corresponding to the recessed region R1 (and/or the recessed region R2), on the semi-finished product of the composite material layer 122, the reinforcing layer SF2 can be stacked along the axial direction D1 first, and then the foregoing stacked layers SF1 can be stacked along the axial direction D1, so that the reinforcing layer SF2 is located between the recessed region R1 (and/or the recessed region R2) and the above-mentioned stacked layers SF1; and in the remaining region on the semi-finished product of the composite material layer 122, only the above-mentioned stacked layers SF1 are stacked. In this example, the stacking modes and fiber arrangement modes of the reinforcing layer SF2 and the stacked layers SF1 can refer to the related descriptions of FIGS. 11 to 13, and will not be repeated here. Therefore, even if the reinforcing layer SF2 is added, the entire rotary seat 12 can still maintain its surface flatness. In addition, since the recessed regions R1 and R2 are respectively provided at the carrying portion 121B and the connecting portion 121A close to the carrying portion 121B, the center of gravity of the base 121 is closer to the axis of the output shaft 112 of the first torque motor than the center of gravity of the base 121 without the recessed regions R1 and R2. For the case 121 with the recessed regions R1 and R2, the rotational center-of-gravity is lower, resulting in less rotational inertia, so that the energy consumption of the first torque motor may be reduced.

Figure 4:
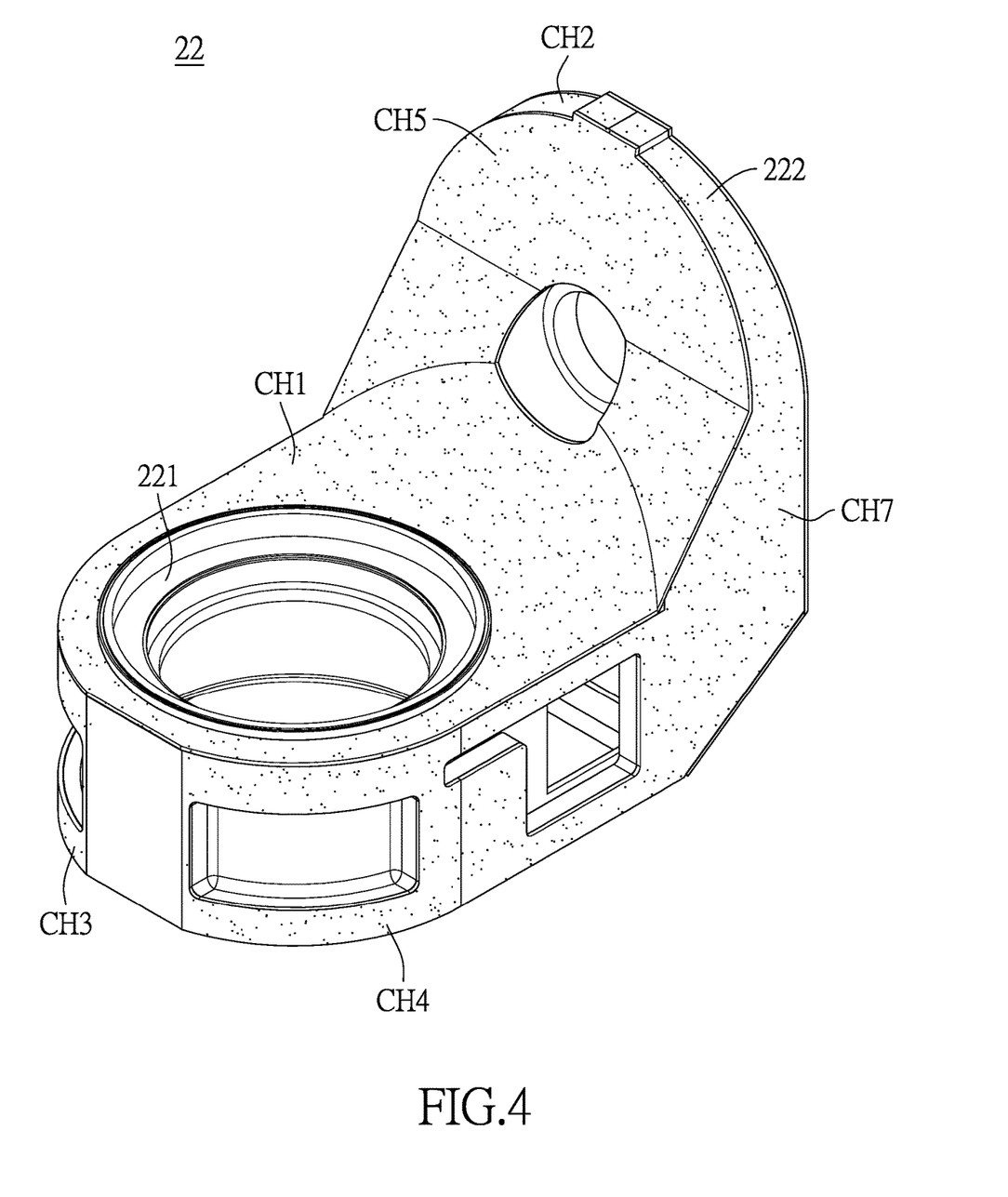
FIGS. 4 and 5 are perspective views of a rotary seat at different view points according to another embodiment of the present invention.
Figure 5:
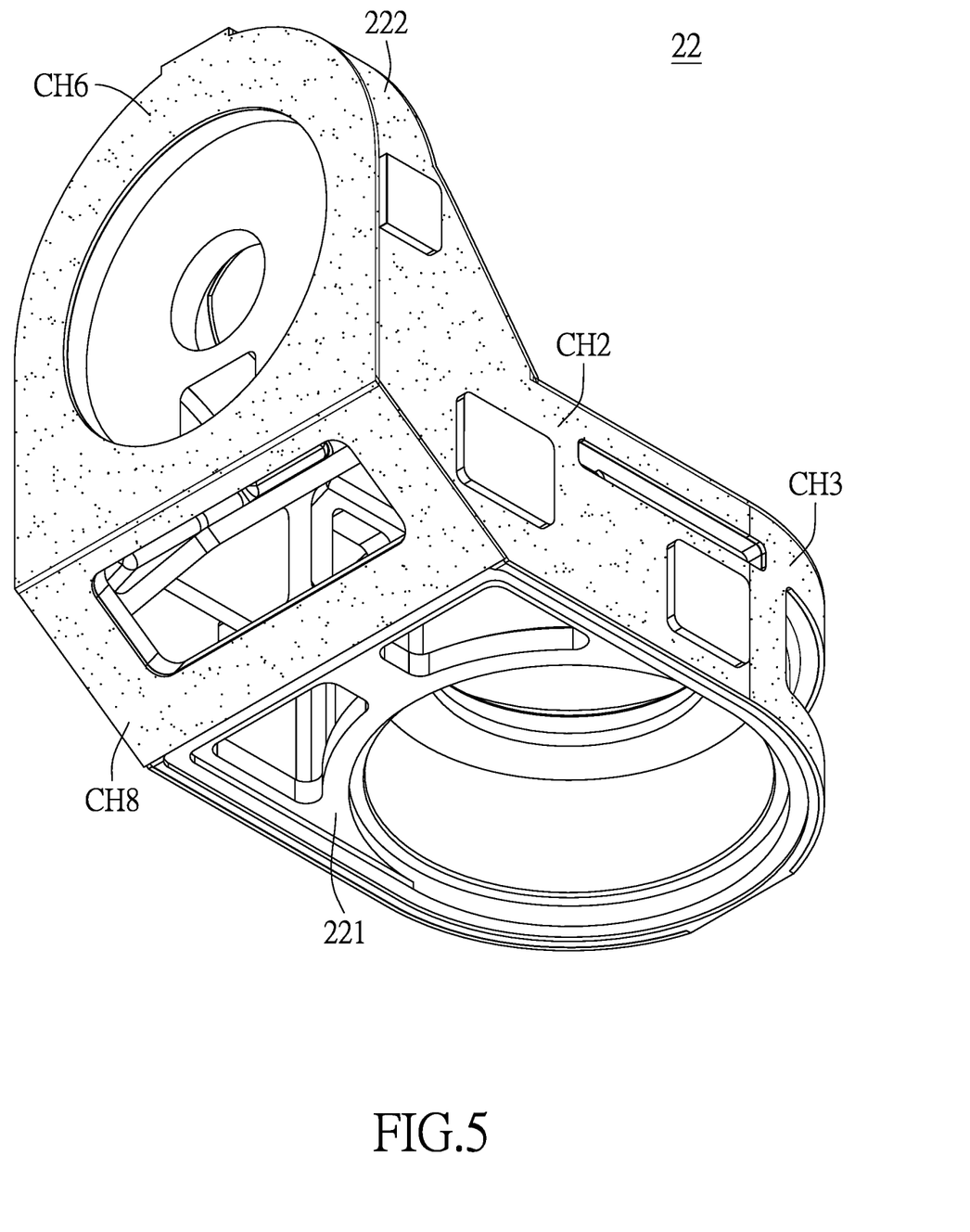
Figure 6:
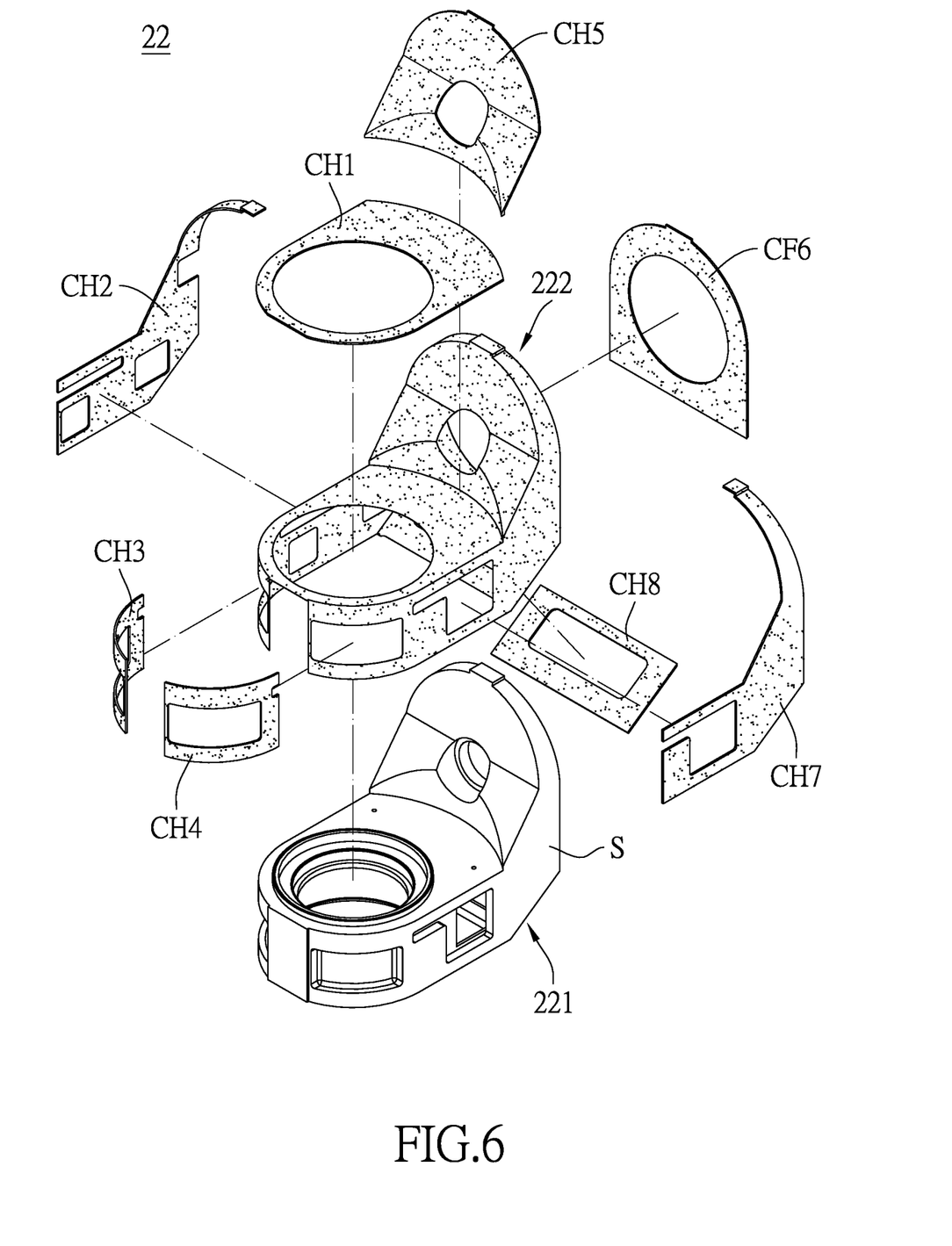
FIG. 6 is an exploded view of the rotary seat of FIG. 4.

In this embodiment, the composite material layer 122 is a one-piece outer cover made of composite material, and is attached to the outer surface S of the base 121 in a pasting manner, as shown in FIG. 3, and the shape of the outer cover is designed according to the shape of each region, which the composite material layer is to be attached to, on the base 221. However, the present invention is not limited to this embodiment. In other embodiments of the present invention, as shown in FIGS. 4 to 6, the composite material layer 222 for the rotary seat 22 is a pieced-up structure; and for example, splicing pieces CH1 to CH8 are glued together and adhered to the outer surface S of the base 221 one by one according to their shapes, and the shape of a respective splicing piece is designed according to a shape of a specific region, which this splicing piece is to be attached to, on the base 221. These splicing pieces CH1 to CH8 are distributed on the outer surface S and are in contact with each other.

Figure 7:
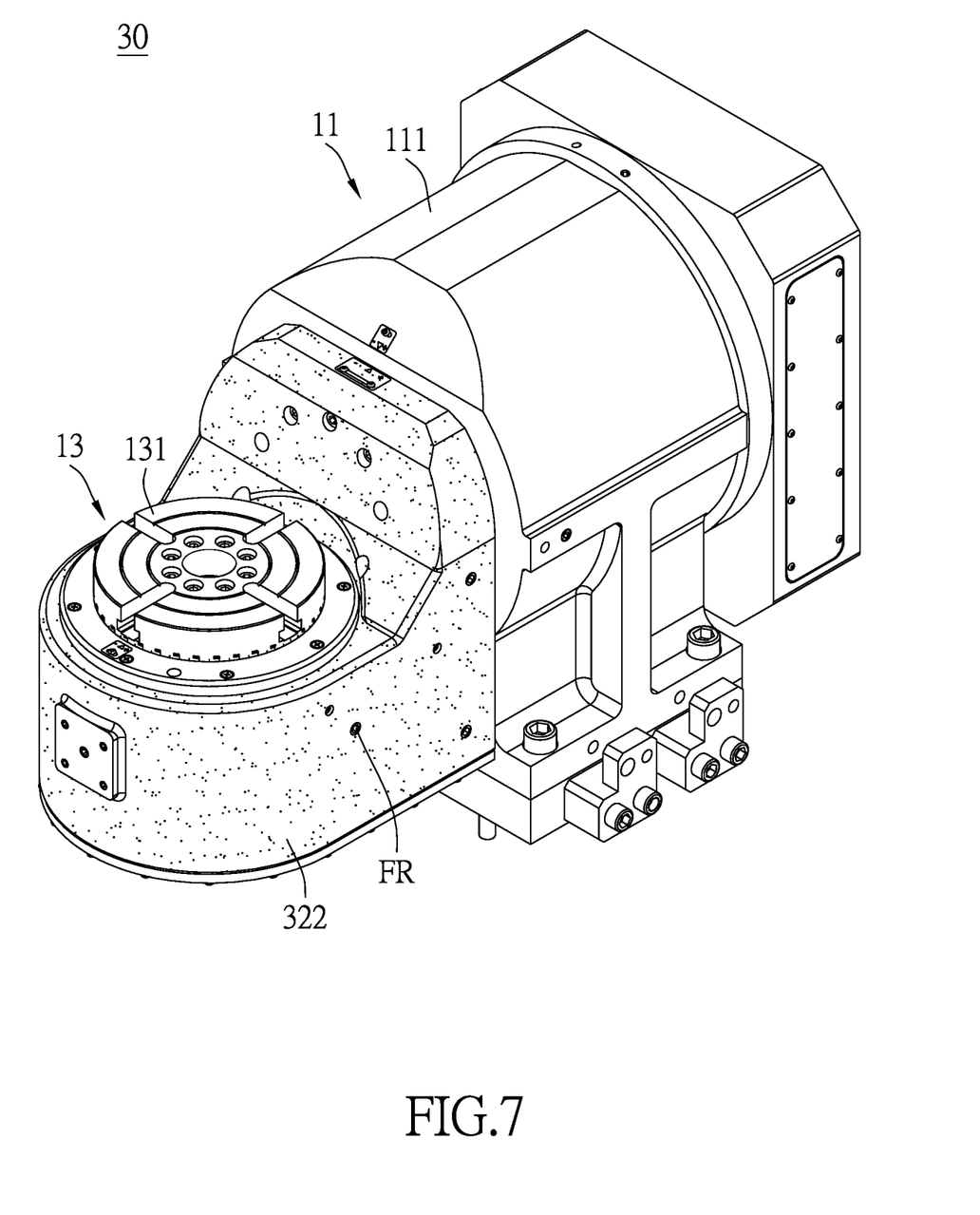
FIG. 7 is a perspective view of a rotary table according to another embodiment of the present invention.

In this embodiment, the composite material layer 122 can be fixed to the outer surface S in a fastening manner instead of the pasting manner. For example, as shown in FIG. 7, the composite material layer 322 for the rotary seat 32 is fastened to the outer surface of the base by screws FR.

Figure 8:
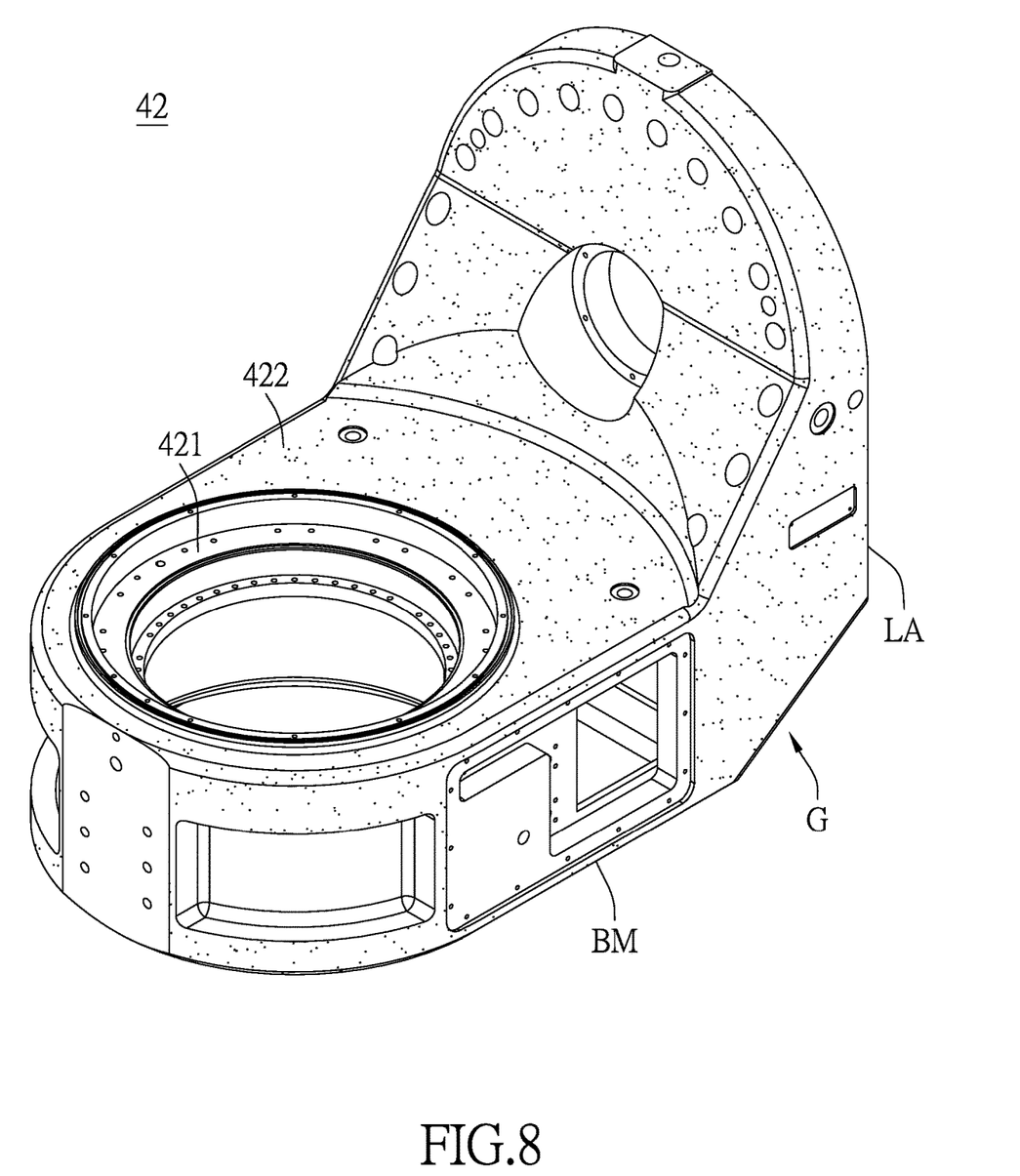
FIGS. 8 and 9 are perspective views of a rotary seat at different view points according to yet another embodiment of the present invention.
Figure 9:
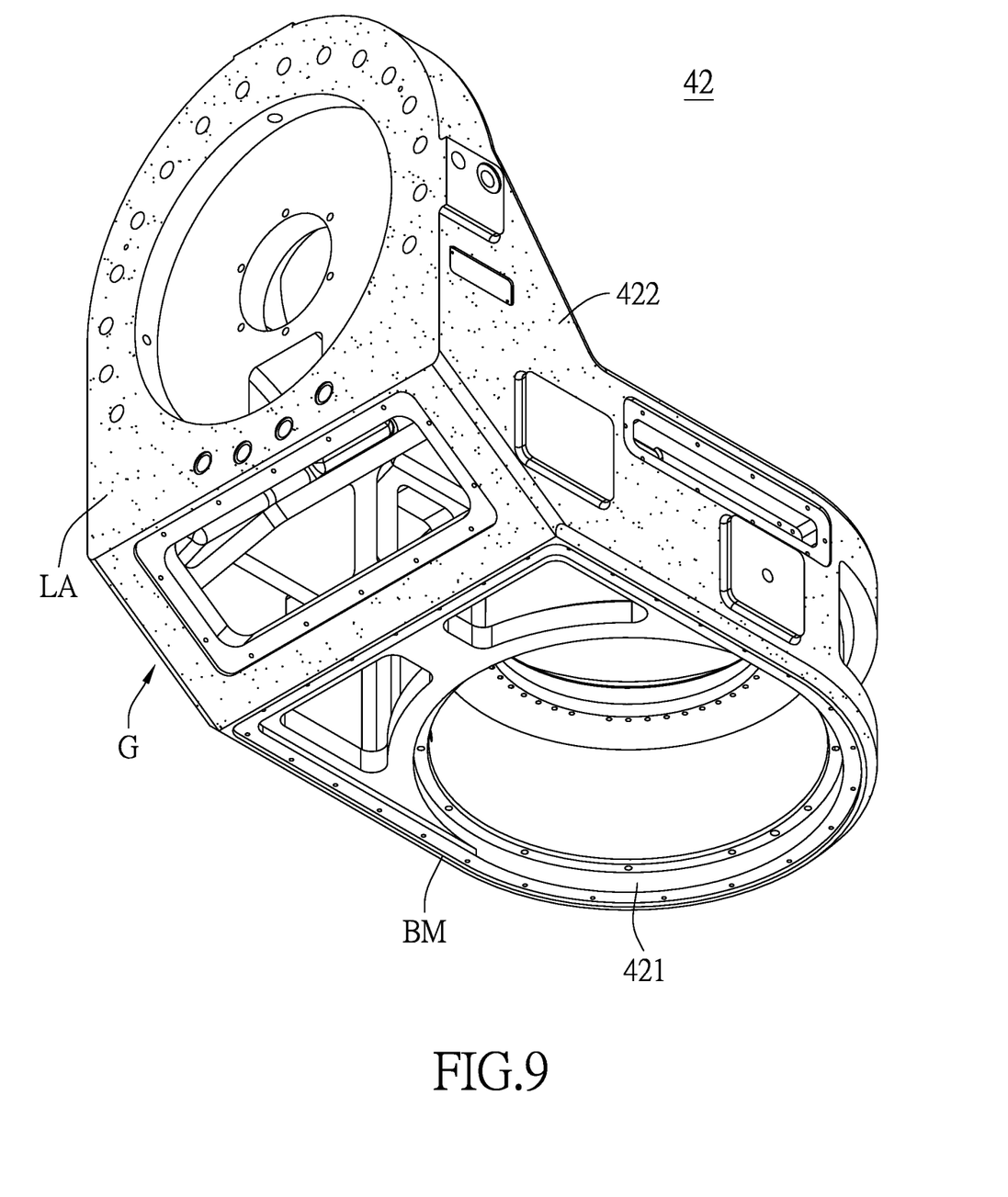

In addition, in order to achieve a lighter weight for the rotary seat of the present invention, the metal base of the rotary seat can reduce its volume without affecting the load-bearing strength of the rotary seat and the accommodation space of the base. For example, as shown in FIGS. 8 and 9, a recessed angle G can be formed between the bottom BM and the side surface LA of the rotary seat 42, and the side surface LA is the outer surface of the connection between the rotary seat 42 and the output shaft of the torque motor of the driving device. Although the weight percentage of the metal base 421 is higher than that of the outer composite material layer 422, changing the position of the structural center of gravity by cutting the structure of the base causes the height of the rotational center of gravity to become shorter and further causes the rotational inertia to become less, leading to the enhancement of the work efficiency of the rotary table. Moreover, reducing the weight of the metal base 421 (by cutting the structure of the base) slightly affects the structural strength and rigidity, and however, by covering the above-mentioned composite material layer 422 on the surface of the base, the specific strength and specific rigidity of the composite material layer may compensate for the influence caused by reducing the weight of the seat body.

Figure 10:
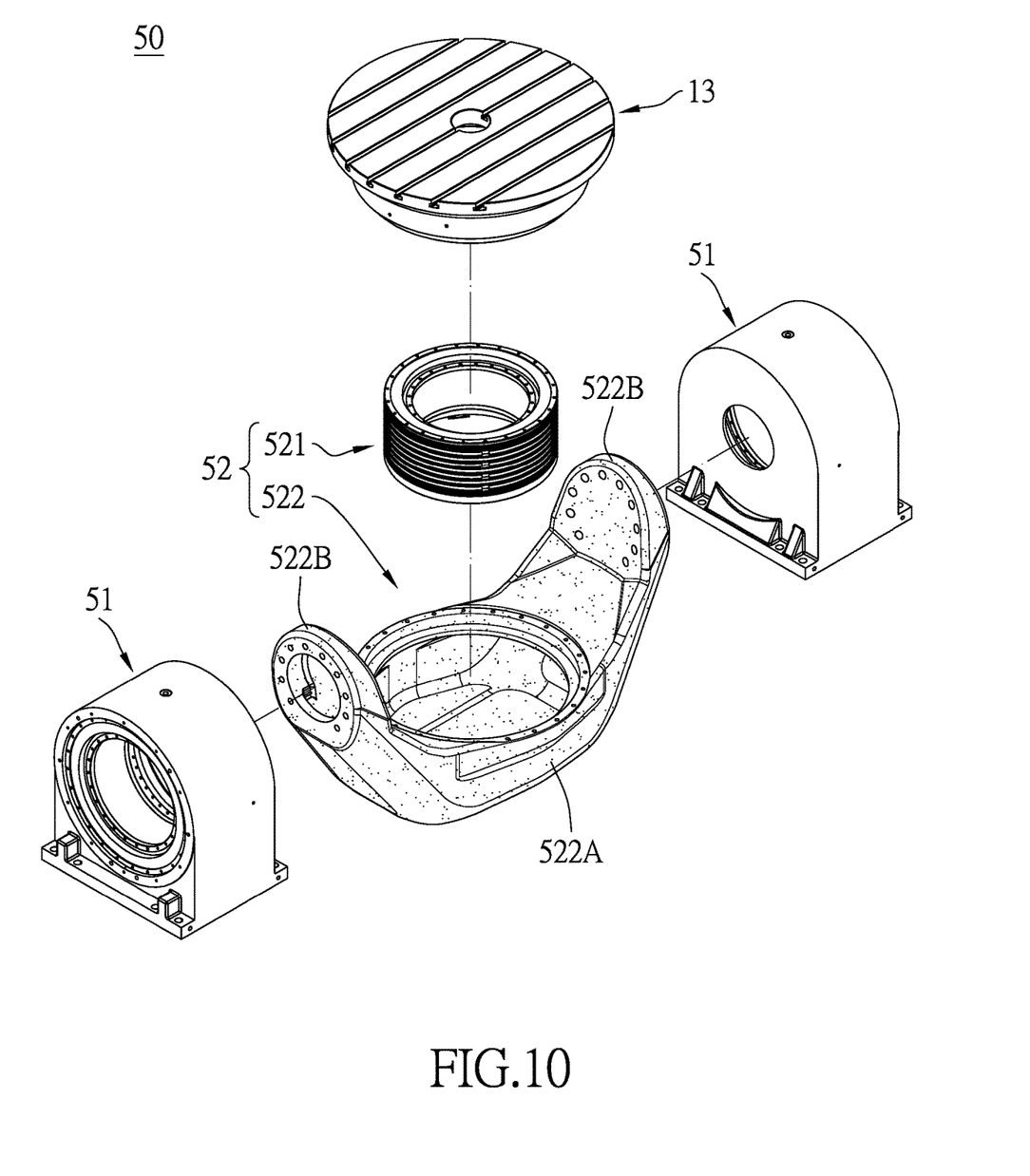
FIG. 10 is an exploded view of a rotary table according to yet another embodiment of the present invention.

In addition, although the above embodiments are described based on an example of the rotary seat with only one connecting portion (that is, the rotary seat is L-shaped), the invention is not limited to this example. In other embodiments, as shown in FIG. 10, the rotary seat 52 of the rotary table 50 includes a base 521 and a composite material layer 522. In addition to the base 522A, the composite material layer 522 may also include two connecting portions 522B located at two opposite sides of the base 522A, and the shape of the rotary seat 52 presents a "U" shape, so the two connecting portions 521B can be rotatably assembled to the two driving devices 51 respectively.

Although the present invention is disclosed as above in the foregoing embodiments, these embodiments are not intended to limit the present invention. Without departing from the spirit and scope of the present invention, all changes, modifications, and combinations of various implementation modes are available and fall into the scope of patent protection of the present invention. For the scope of protection defined by the present invention, please refer to the attached claims

What is claimed is:

1. A rotary seat of a rotary table, the rotary table comprising at least one first driver, and the rotary seat comprising:
    a turntable, including a second driver and a disk body rotatably connected to the second driver;
    a base, made of metal and including:
        at least one connecting portion, rotatably connected to the at least one first driver; and
        a carrying portion, laterally connected to the at least one connecting portion and including a recess that is configured to accommodate the turntable and includes a first opening from which the disk body protrudes; and
    a composite material layer comprising fiber and resin and configured to being attached to outer surfaces of the at least one connecting portion and the carrying portion, wherein a rotation axis of the turntable is not parallel to a rotation axis of the base.

2. The rotary seat of the rotary table as claimed in claim 1, wherein the composite material layer is a stacked structure and comprises a plurality of stacked layers, the plurality of stacked layers is stacked along a first axial direction perpendicular to the outer surface, the fibers of each of the plurality of stacked layers are arranged in a direction parallel to a second axial direction, the second axial directions of at least two of the plurality of stacked layers are not parallel, and the second axial direction is perpendicular to the first axial direction.

3. The rotary seat of the rotary table as claimed in claim 2, wherein the second axial directions of the plurality of stacked layers are symmetrically arranged in the first axial direction.

4. The rotary seat of the rotary table as claimed in claim 3, wherein the outer surface of the base is provided with at least one recessed region, the composite material layer further comprises at least one reinforcing layer, the at least one reinforcing layer and the plurality of stacked layers are stacked and attached to the at least one recessed region, the at least one reinforcing layer is located between the at least one recessed region and the plurality of stacked layers, fibers of the at least one reinforcing layer are arranged in a direction parallel to a third axial direction, and the third axial direction of the fibers of the at least one reinforcing layer is the same as the second axial direction of the fibers of one of the plurality of stacked layers.

5. The rotary seat of the rotary table as claimed in claim 1, wherein the composite material layer comprises a plurality of splicing pieces, and the plurality of splicing pieces is distributed on the outer surface and in contact with each other.

6. The rotary seat of the rotary table as claimed in claim 1, wherein the composite material layer is fixed on the outer surface by pasting or fastening.

7. The rotary seat of the rotary table as claimed in claim 1, wherein the base comprises at least one connecting portion and a carrying portion, the carrying portion is connected to the at least one connecting portion, the recess is located in the carrying portion, the connecting portion is configured to be rotatably connected to a driving device, and the composite material layer comprises a third opening to expose a junction between the connecting portion and the driving device.

8. The rotary seat of the rotary table as claimed in claim 1, wherein the base comprises at least one connecting portion and a carrying portion, the carrying portion is connected to the at least one connecting portion, an angle between the carrying portion and the connecting portion is greater than 0 degrees, the recess is located in the carrying portion, and the connecting portion is configured to be rotatably connected to a driving device.

9. The rotary seat of the rotary table as claimed in claim 1, wherein a volume of the composite material layer accounts for 20% to 50% of a sum of a volume of the base and a volume of the composite material layer.

10. A rotary table comprising:
    the rotary seat in claim 1; and
    a driving device comprising a first driver connected to the rotary seat and configured to drive the rotary seat to rotate.

* * * * *